United States Patent
Leu

(10) Patent No.: US 7,522,353 B2
(45) Date of Patent: Apr. 21, 2009

(54) OPTICAL LENS MODULE

(75) Inventor: Charles Leu, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 540 days.

(21) Appl. No.: 11/304,003

(22) Filed: Dec. 14, 2005

(65) Prior Publication Data

US 2006/0170809 A1  Aug. 3, 2006

(30) Foreign Application Priority Data

Jan. 28, 2005  (CN)  ........................ 2005 1 0033067

(51) Int. Cl.
G02B 3/00 (2006.01)
C03B 37/018 (2006.01)

(52) U.S. Cl. .................... 359/737; 359/652; 359/654; 65/415

(58) Field of Classification Search .......... 359/641–654, 359/708, 718, 719, 724, 737, 738; 65/30.13, 65/24, 30.1, 40, 43, 8, 106, 427, 415; 356/361
See application file for complete search history.

(56) References Cited

U.S. PATENT DOCUMENTS

| 3,634,219 | A | * | 1/1972 | Sinai | ..................... 204/157.45 |
| 4,273,826 | A | * | 6/1981 | McCollister et al. | ..... 428/310.5 |
| 4,758,071 | A | * | 7/1988 | McLaughlin et al. | ........ 359/653 |
| 5,442,482 | A | * | 8/1995 | Johnson et al. | ............. 359/619 |
| 6,556,363 | B2 | | 4/2003 | Chiu | |
| 6,661,581 | B1 | * | 12/2003 | Sankur | ........................ 359/653 |
| 7,359,124 | B1 | * | 4/2008 | Fang et al. | .................. 359/666 |
| 2003/0161048 | A1 | * | 8/2003 | Tsuda et al. | ................. 359/652 |
| 2005/0036738 | A1 | * | 2/2005 | Zhou et al. | ..................... 385/33 |
| 2005/0195503 | A1 | * | 9/2005 | Chen | .......................... 359/819 |
| 2006/0263003 | A1 | * | 11/2006 | Asai et al. | ...................... 385/14 |
| 2007/0091453 | A1 | * | 4/2007 | Ushiro et al. | ................ 359/652 |

FOREIGN PATENT DOCUMENTS

CN       1894606         1/2007
JP       10-221540     * 8/1998

* cited by examiner

Primary Examiner—Lin Ye
Assistant Examiner—Euel K Cowan

(57) ABSTRACT

A lens unit (20) includes a lens body (24) and a thin film (22) provided thereon. The thin film comprises a plurality of sections (220, 222, 224) from a center to a periphery. Each section has a different refractive index. The refractive index of the each section of the thin film increases from the center to the periphery of the lens body/thin film. Such a lens unit can be advantageously incorporated into a compact digital camera.

20 Claims, 3 Drawing Sheets

OPTICAL LENS MODULE

BACKGROUND OF THE INVENTION

1. Field of the Invention

The present invention relates to optical lens modules, especially to an optical lens module for use in, for example, a digital camera.

2. Discussion of Related Art

With the popularization of electronic products such as digital cameras, the requirements for the optical lenses employed therein is ever increasing. In order to provide high imaging quality, the development of the optical lenses mainly concentrates on the structure and configuration of the optical lenses.

As it is known to those with ordinary skill in the art, light travels at different speeds in different mediums. When a light beam obliquely enters a second medium with a refractive index $n_2$ from a first medium with a refractive index $n_1$, the direction of propagation of the light beam, at a boundary between the first and second mediums, will change. This change in the propagation direction is the so-called refraction phenomenon. Snell's law discloses that the ratio between the sine of incident angle and that of refractive angle is constant. This law can be expressed as below:

$$n_1 \sin\theta_1 = n_2 \sin\theta_2$$

Wherein $n_1$ and $n_2$ represent refractive indices of a first medium and a second medium, respectively. $\theta_1$ represents an incident angle, and $\theta_2$ represents a refractive angle.

According to Snell's law, when light transmits from air to glass, for example, the refractive index and shape of a lens are main factors in determining the deflection of the light. Accordingly, the development of the optical modules mainly concentrates on the refractive index and shape of the lens.

FIG. 6 shows such a focalization principle, using a conventional lens. This principle discloses that light can be focused and a formatted image can be formed with a lens having a proper shape and a smooth surface.

A lens module of a typical digital camera generally includes a plurality of optical lenses. Generally, in order to obtain a satisfactory imaging performance, the lens module commonly employs at least three optical lenses. Each optical lens is also referred to as a lens unit.

Referring to FIG. 7, a conventional lens/camera assembly includes a lens module 10, a sleeve 14, and a light-receiving unit 12. The lens module 10 and the light-receiving unit 12 are received in the sleeve 14. The light-receiving unit 12 is arranged at the focus of the lens module 10. The light-receiving unit 12 is configured for converting collected light signals into electronic signals.

The lens module 10 includes a plurality of lens units 102 received therein. Each lens units 102 has a different refractive index relative to the others. By such a configuration of the lens units 102, a relatively short focal length of the lens module 10 may be achieved. Therefore, the volume of the lens module 10 is relatively smaller. However, a plurality of lens units has to be employed, which increases complexity and costs of the lens module.

Accordingly, a compact lens module with a lower complexity and cost is needed.

Therefore, a heretofore-unaddressed need exists in the industry to address the aforementioned deficiencies and inadequacies.

SUMMARY OF THE INVENTION

In a preferred embodiment, an optical lens module is provided, which includes a lens body and a thin film provided thereon. The thin film, from a center to a periphery of the lens body, is composed of a plurality of film sections. Each film section has a different refractive index. The refractive index of each film section of the thin film increases from the center to the periphery of the lens body.

The lens body has an optical axis and is advantageously centro-symmetrical respective to the optical axis associated therewith. Each film section is also, beneficially, centro-symmetrical with respect to the optical axis of the lens body.

A refractive index of a film section that is located at a center of the thin film is, usefully, equal (or nearly so) to that of the lens body.

Comparing with the conventional lens module, the optical lens module of the preferred embodiment has the following advantages. Firstly, only one lens body is needed to acquire the different refractive indices provided by the multi-lens prior art system, which leads to cost reduction. Secondly, the refractive index changes from the central film section to that of the periphery, thus permitting light to change its direction accordingly. Thirdly, the optical lens module can focus by itself to get a better image, and thus it should provide for an improved image quality.

BRIEF DESCRIPTION OF THE DRAWINGS

Many aspects of the optical lens module can be better understood with reference to the following drawings. The components in the drawings are not necessarily to scale, emphasis instead being placed upon clearly illustrating the principles of the present optical lens module. Moreover, in the drawings, like reference numerals designate corresponding parts throughout the several views.

DETAILED DESCRIPTION OF THE PREFERRED EMBODIMENT

Figure 1:
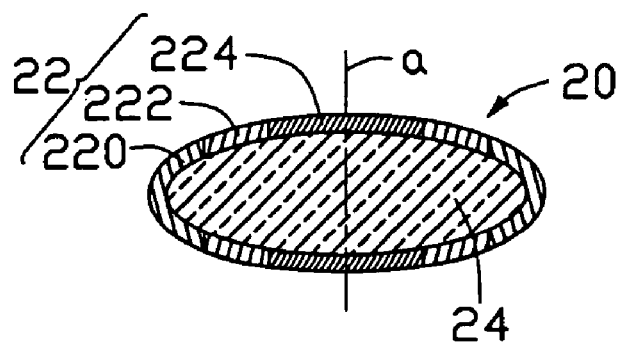
FIG. 1 is a sectional, schematic view of an optical lens module of a preferred embodiment.
Figure 2:
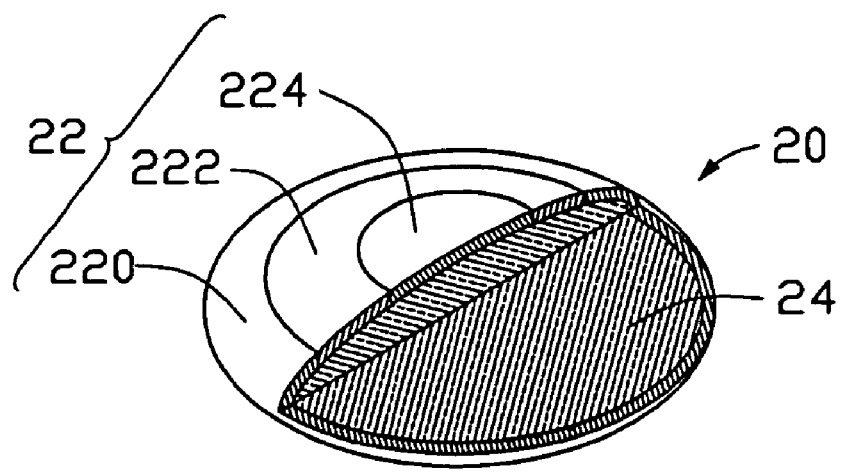
FIG. 2 is a cutaway view of the optical lens module of FIG. 1.
Figure 3:
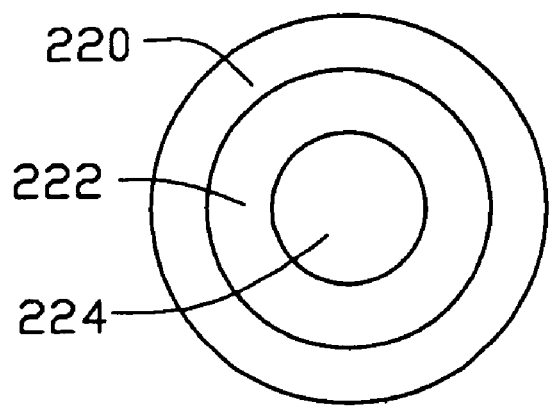
FIG. 3 is a top view of the optical lens module of FIG. 1.

Referring to FIGS. 1 to 3, a lens unit 20 according to a preferred embodiment includes a lens body 24 and a thin film 22 provided thereon. The lens body 24 may be formed of glass or plastic. The lens body 24 has an optical axis, indicated with a reference letter "a" in FIG. 1. The lens body 24 is beneficially centro-symmetrical (or at least essentially so) with respect to the optical axis "a". The lens body 24 may be substantially in a form of a shape selected from the group consisting of ellipsoid, aspherical, and spherical. In the illustrated embodiment, the lens body 24 is a double-convex lens body.

The thin film 22 is formed on a surface of the lens body 24, and has a plurality of film sections with different respective refractive indices. In the illustrated embodiment, the thin film 22 has three sections when viewed from a top side thereof along a direction parallel to the optical axis "a", i.e., an annular circumferential section 220, an annular intermediate section 222, and a circular top central section 224 (i.e., a section covering a geometrical center of the thin film 22), arranged in that order. The circumferential section 220 of the thin film 22 is formed on a circumferential portion of the lens body 24. The top central section 224 of the thin film 22 is formed on a top central portion of the lens body 24. The intermediate section 222 of the thin film 22 is formed on the lens body 24 between the circumferential section 220 and the top central section 224. Each of the sections 220, 222, and 224 is centro-symmetrical with respect to the optical axis "a" of the lens body 24. The optical axis "a" passes through an essentially central axis of the top central section 224 of the thin film 22. It should be noted that the number of sections of the thin film 22 is not limited to the illustrated embodiment. However, the minimum number of sections of the thin film 22 is two.

The refractive index of the thin film 22 gradually increases from the top central section 224 to the circumferential section 220, with the sections 220, 222, and 224 each having a uniform refractive index and all having substantially the same thickness. In addition, the refractive index of the top central section 224 is preferably substantially equal to that of the lens body 24. A refractive index of the lens body 24 is uniform. The refractive indices of the film sections 220, 222, and 224 may vary from one another on any basis (e.g., composition) that will produce the desired gradient in the refractive indices therebetween.

In the illustrated embodiment, each section 220, 222, and 224 of the thin film 22 is made of a glass incorporating at least one of Ag and $CsO_2$. The concentration of Ag and/or $CsO_2$ in each section 220, 222, and 224 of the thin film 22 may be configured so as to obtain a predetermined refractive index. In the illustrated embodiment, the concentration of Ag and/or $CsO_2$ in circumferential section 220 is higher than that in the top central section 224. It is, however, to be understood that the compositions of the sections 220, 222, and 224 could also be suitably varied by other means (e.g., alter percentage of one or more component; and/or add or delete one or more components).

The thin film 22 is opportunely generally formed by a direct current reactive magnetron sputtering method or by a radio frequency reactive magnetron sputtering method. Advantageously, an argon gas is used as an environmental inert gas, and an oxygen gas is used as an oxidation gas.

In order to reduce loss of light due to reflection, an anti-reflective film (not shown) is beneficially formed on the thin film 22.

Figure 4:
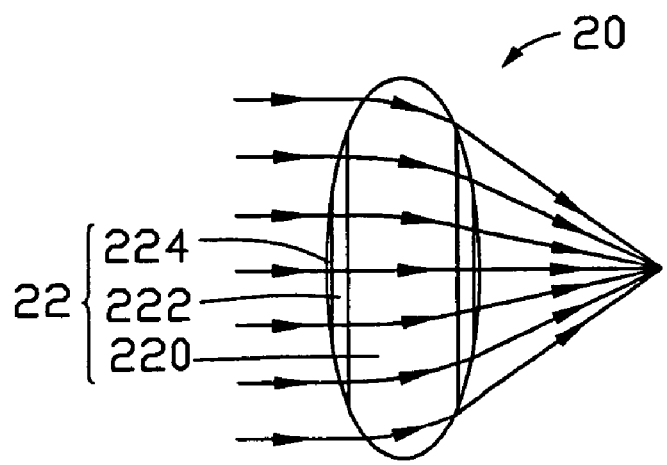
FIG. 4 is a schematic view a focalization principle of the optical lens module of FIG. 1.

According to Snell's law, the larger the refractive index is, the smaller the refractive angle is. In other words, the direction of refractive light deviates more from the original incident direction of that light. Referring to FIG. 4, the refractive index of the circumferential section 220 of the thin film 22 is largest, thus the refractive angle associated therewith is smallest. While the refractive index of top central section 224 is smallest, thus the refractive angle is largest. At the central point of the top central section 224, light enters the lens body 24 without deflecting, whereat therefore, the refractive angle is zero. The net effect of the variance in refractive indices of the film sections 220, 222, and 224 is that the focal length is reduced relative to a lens (e.g., 102) not having such a thin film 22 thereon.

Figure 5:
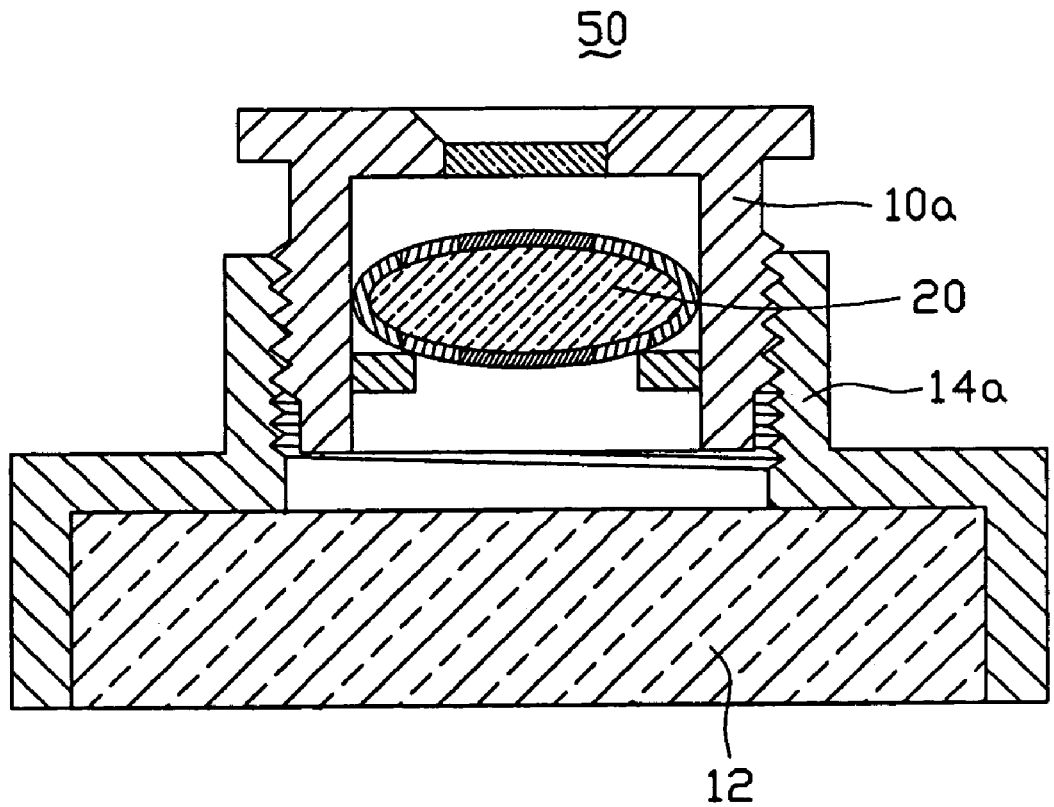
FIG. 5 is a schematic, cross-sectional view of the optical lens module of the preferred embodiment, incorporating the lens unit of FIG. 1.
Figure 6:
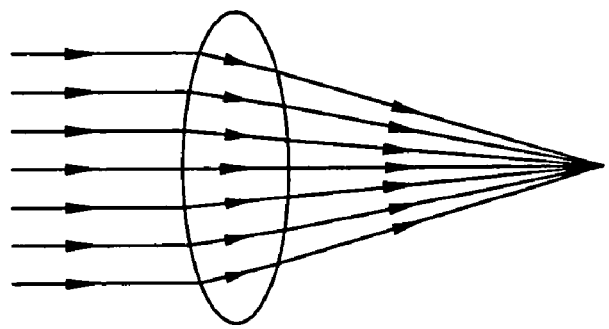
FIG. 6 is a schematic view showing a focalization principle of a conventional lens.
Figure 7:
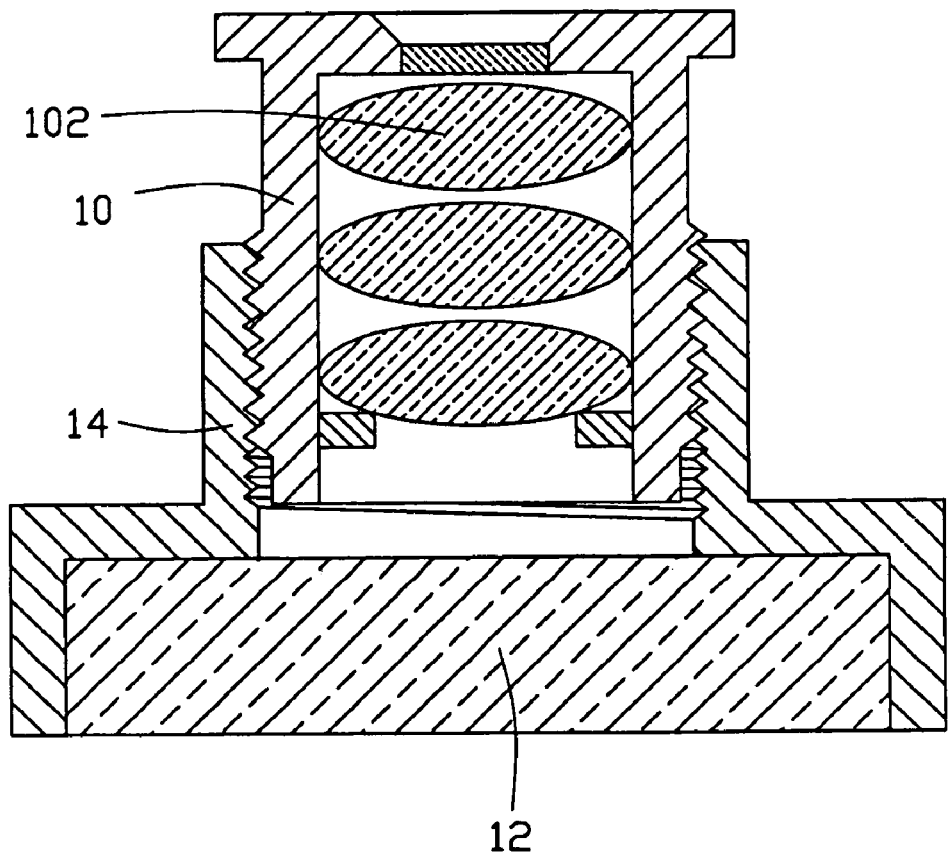
FIG. 7 is a schematic, cross-sectional view of a conventional lens assembly.

Referring to FIG. 5, a present lens assembly/digital camera 50 is substantially equal to that shown in FIG. 7, except that the lens unit 20 is the only one lens unit within the lens module 10a. The digital camera 50 further includes a sleeve 14a and a light-receiving unit 12. As the lens module 10a needs to hold only one lens unit 20 as opposed to a plurality of lens units (e.g., 102 in FIG. 7), both the lens module 10a and the sleeve 14a can be smaller than their counterparts in the prior art lens assembly of FIG. 7. As such, comparing with that in FIG. 7, the lens assembly/digital camera 50 of the preferred embodiment shown in FIG. 5 has an advantageous compactness and simplicity. Since there is only one lens unit 20 needed, the cost of the digital camera 50 is reduced noticeably.

It should be emphasized that the above-described preferred embodiment is merely a possible example of implementation of the principles of the invention and is merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention and be protected by the following claims.

I claim:

1. A lens unit, comprising: a lens body and a thin film provided thereon, the thin film comprising a plurality of sections refractive indices of the sections of the thin film gradually increasing from one of the sections at the center of the lens body to another one of the sections at the periphery of the lens body.

2. The lens unit as claimed in claim 1, wherein the number of the sections of the thin film is more than two.

3. The lens unit as claimed in claim 1, wherein the lens body has an optical axis, the lens body being essentially centro-symmetrical respective to the optical axis associated therewith.

4. The lens unit as claimed in claim 3, wherein each section of the thin film is essentially centro-symmetrical with respect to the optical axis of the lens body.

5. The lens unit as claimed in claim 3, wherein said one of the sections at the center of the lens body has a refractive index substantially equal to that of the lens body.

6. The lens unit as claimed in claim 1, wherein the shape of the lens body is selected from one of ellipsoid, aspherical, and spherical.

7. The lens unit as claimed in claim 1, wherein the thin film is comprised of a glass incorporating at least one of Ag and $CsO_2$.

8. The lens unit as claimed in claim 7, wherein the content of at least one of Ag and $CsO_2$ becomes larger from said one of the sections at the center of the lens body to said another one of the sections at the periphery of the lens body.

9. The lens unit as claimed in claim 1, wherein the lens body is comprised of one of glass and plastic.

10. A digital camera, comprising:
a sleeve;
a lens unit received in the sleeve, the lens unit having a focus, the lens unit comprising: a lens body and a thin film provided thereon, the thin film comprising a plurality of sections refractive indices of the sections of the thin film gradually increasing from one of the sections at the center of the lens body to another one of the sections at the periphery of the lens body; and a light-receiving unit received in the sleeve, the light-receiving unit being configured for converting light collected from the lens unit into electronic signals.

11. A lens unit, comprising:

a lens body having a surface; and a thin film formed on the surface of the lens body, the thin film including a plurality of sections continuously arranged along the surface of the lens body, each of the plurality of sections having a uniform refractive index, the refractive indices of the plurality of sections gradually increasing from one of the sections at a center of the surface of the lens body to another of the sections at a periphery of the surface of the lens body.

12. The lens unit as claimed in claim 11, wherein the lens body has an optical axis, and each of the plurality of sections of the thin film is essentially centro-symmetrical with respect to the optical axis of the lens body.

13. The lens unit as claimed in claim 12, wherein said one of the sections at a center of the surface of the lens body is a circular central section, and the plurality of sections of the thin film include the circular central section and an annular circumferential section around the circular central section, the circular central section and the annular circumferential section both being centered on the optical axis of the lens body.

14. The lens unit as claimed in claim 13, wherein a refractive index of the circular central section is substantially equal to that of the lens body.

15. The lens unit as claimed in claim 11, wherein a refractive index of the lens body is uniform, and the plurality of sections of the thin film have substantially the same thickness.

16. The lens unit as claimed in claim 11, wherein the lens body is a double-convex lens body, and the thin film is formed on the surface of both sides of the lens body.

17. The lens unit as claimed in claim 11, wherein the thin film is comprised of glass incorporating at least one of Ag and $CsO_2$, and the content of at least one of Ag and $CsO_2$ becomes larger from said one of the sections at a center of the surface of the lens body to said another of the sections at a periphery of the surface of the lens body.

18. The lens unit as claimed in claim 1, wherein the thin film surrounds the lens body, and each of the plurality of sections has a uniform refractive index.

19. The digital camera as claimed in claim 10, wherein a refractive index of the lens body is uniform, and the plurality of sections are continuously distributed on a common surface of the lens body.

20. The digital camera as claimed in claim 10, wherein each of the plurality of sections has a uniform refractive index, and the plurality of sections of the thin film have substantially the same thickness.

* * * * *